(12) United States Patent
Zhou et al.

(10) Patent No.: US 11,680,574 B2
(45) Date of Patent: Jun. 20, 2023

(54) BLOWER

(71) Applicant: Nanjing Chervon Industry Co., Ltd., Nanjing (CN)

(72) Inventors: Peng Zhou, Nanjing (CN); Toshinari Yamaoka, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 142 days.

(21) Appl. No.: 17/188,365

(22) Filed: Mar. 1, 2021

(65) Prior Publication Data

US 2021/0293248 A1  Sep. 23, 2021

(30) Foreign Application Priority Data

Mar. 18, 2020  (CN) .......................... 202010190105.3

(51) Int. Cl.
| | | |
|---|---|---|
| *F04D 27/00* | (2006.01) | |
| *F04D 25/06* | (2006.01) | |
| *F04D 29/32* | (2006.01) | |
| *F04D 29/40* | (2006.01) | |
| *F04D 19/00* | (2006.01) | |
| *A01G 20/47* | (2018.01) | |

(Continued)

(52) U.S. Cl.
CPC ........... *F04D 27/004* (2013.01); *A01G 20/47* (2018.02); *B08B 5/02* (2013.01); *B08B 13/00* (2013.01); *F04D 19/002* (2013.01); *F04D 25/06* (2013.01); *F04D 25/0673* (2013.01); *F04D 29/325* (2013.01); *F04D 29/403* (2013.01)

(58) Field of Classification Search
CPC .... F04D 19/002; F04D 25/06; F04D 25/0673; F04D 27/04; B08B 5/02; B08B 13/00; E01H 1/0809
See application file for complete search history.

(56) References Cited

U.S. PATENT DOCUMENTS

2016/0198636 A1    7/2016 Poole et al.
2017/0089349 A1*   3/2017 Bylund ................. F04D 29/325

FOREIGN PATENT DOCUMENTS

CN          209703394 U     11/2019

OTHER PUBLICATIONS

EPO, extended European search report issued on EP publication No. 3882467A1, dated Jul. 20, 2021, 7 pages.
(Continued)

*Primary Examiner* — Kenneth J Hansen
(74) *Attorney, Agent, or Firm* — Greenberg Traurig, LLP

(57) ABSTRACT

A blower includes a housing, a fan, a motor, and a speed regulator assembly including a switch for controlling the motor operation, a control member, and an actuating member both enabled to control the switch. The actuating member can move between an off state and an on state. The actuating member can move to a predefined limit position. The rotational speed of the motor corresponding to the predefined limit position is a predefined rotational speed. When the actuating member is in the off state, the motor stops running. When the actuating member is in the on state, the motor rotates. The control member has at least a first control state and a second control state. In the second control state, the motor runs at a maximum rotational speed. In the first control state, the motor runs at an intermediate speed lower than the maximum rotational speed.

20 Claims, 11 Drawing Sheets

(51) Int. Cl.
*B08B 5/02* (2006.01)
*B08B 13/00* (2006.01)

(56) References Cited

OTHER PUBLICATIONS

CIPO, examination report issued on Canadian patent application No. 3,112,245, dated Oct. 5, 2022, 9 pages.

* cited by examiner

BLOWER

RELATED APPLICATION INFORMATION

This application claims the benefit under 35 U.S.C. § 119(a) of Chinese Patent Application No. CN 202010190105.3, filed on Mar. 18, 2020, which is incorporated by reference in its entirety herein

BACKGROUND

A blower is a commonly used gardening tool that helps users clean up fallen leaves and dust in the garden. Generally speaking, in order to adapt to different working conditions, the blower is equipped with operating members for the user to operate to regulate speed and boost speed. The blower is also provided with a start switch to start the motor. For existing blowers, the start switch, the speed regulator, and the accelerator are separately provided. The user needs to operate the start switch first, and then operate the speed regulator or accelerator to meet the user's needs. Said operations are not conducive to the continuity of user operations. Moreover, such settings increase the user's operation steps, which is very inconvenient for the user's operation. For existing blowers, when the start switch is accidentally triggered, the motor is likely to run at the maximum rotational speed, resulting in the maximum air output volume of the blower, bringing stones and branches, etc. up to accidentally injure people or objects, causing safety hazards.

SUMMARY

In one example of the disclosure, a blower includes: a housing; a fan arranged in the housing; a motor arranged in the housing and connected to the fan; and a speed regulator assembly configured to control the rotational speed of the motor. The speed regulator assembly includes a switch coupled to the motor for controlling the operation of the motor, a control member rotatably connected with the housing for controlling the switch and an actuating member rotatably connected with the housing for controlling the switch, the actuating member is configured to move between an off state and an on state, the actuating member is capable of moving to a predefined limit position in the on state, the rotational speed of the motor corresponding to the predefined limit position is a predefined rotational speed, the motor stops running when the actuating member is in the off state, and the motor rotates when the actuating member is in the on state. The control member includes a first control state and a second control state, the motor is configured to run at a maximum rotational speed greater than the predefined rotational speed when the control member is in the second control state, and the motor is configured to run at an intermediate speed lower than the maximum rotational speed when the control member is in the first control state, the control member is configured to drive the actuating member to move from the off state to the on state during the movement process from an initial state to the first control state, and the actuating member does not cross the predefined limit position when the control member switches from the first control state to the second control state.

In one example, when the actuating member is in the off state and the control member is in the initial state, the motor stops running; the control member forms a rotatable connection with the housing about a second rotation axis; when the actuating member is not driven by an external force, the initial state, the first control state and the second control state respectively correspond to different rotation angles of the control member relative to the housing.

In one example, the actuating member is configured to rotate with respect to the housing about a first rotation axis.

In one example, the control member is configured to rotate with respect to the housing about a second rotation axis.

In one example, the actuating member is at least partially disposed in the housing, the actuating member is configured to rotate about a first rotation axis, and the actuating member is configured to rotate to the on state from the off state with respect to the control member.

In one example, the control member is at least partially disposed in the housing, the control member forms a rotatable connection with the housing about a second rotation axis, and the control member is configured to abut against the switch when the control member rotates about the second rotation axis to the second control state.

In one example, the actuating member is configured to move to the predefined limit position driven by the control member.

In one example, the blower further includes a stopper for preventing the actuating member from crossing the predefined limit position.

In one example, the blower further includes a handle portion fixedly connected or integrally formed with the housing, the handle portion includes a first housing and a second housing, a handle space is formed between the first housing and the second housing, the actuating member is mounted to the handle portion, the actuating member is at least partially accommodated in the handle space, and the stopper is arranged in the handle space and is fixedly connected or integrally formed with the handle portion.

In one example, the switch includes a push rod that can be triggered by the control member and the actuating member, the actuating member includes a drive portion engaging with the push rod; when the actuating member rotates about the first rotation axis to enter the on state, the drive portion drives the push rod to move in a first straight line direction.

In one example, the control member includes a first protrusion, the actuating member further includes a sliding portion; when the control member rotates about the second rotation axis to enter the first control state from the initial state, the first protrusion drives the sliding portion of the actuating member to make the actuating member to rotate.

In one example, the control member further includes a second protrusion, the actuating member is provided with a through hole; when the control member rotates to the second control state from the first control state, the second protrusion passes through the through hole to drive the push rod to move along the first straight line direction.

In one example, the speed regulator assembly further includes an elastic member mounted to the housing, and the elastic member is configured to apply a force to the control member to restore the control member from the second control state to the first control state.

In one example, the control member includes a third protrusion fixedly connected or integrally formed with the control member, the elastic member includes a free end, the housing is provided with a supporting portion that restricts the free end from moving freely, and the free end is in contact with the third protrusion when the control member is in the second control state.

In one example, in the first control state, the control member is capable of holding at a plurality of speed control positions, each of the plurality of speed control positions corresponds to a different intermediate speed of the motor, and one of the plurality of speed control position corresponding to a maximum intermediate speed of the motor is the maximum speed control position when the control member is in the first control state.

In one example, the speed regulator assembly further includes a locking device; when the control member is in the speed control position, the locking device is configured to apply a force to prevent the control member from moving.

In one example, the speed regulator assembly further includes an elastic member mounted to the housing, the elastic member is configured to apply a force to the control member to restore the control member from the second control state to maximum speed control position.

In one example, when the control member is in the second control state, the control member is configured to rotate with respect to the actuating member about the second rotation axis.

In one example of the disclosure, a blower includes: a housing; a fan arranged in the housing; a motor arranged in the housing and configured to drive the fan to rotate; a switch coupled to the motor for controlling the operation of the motor; a control member connected with the housing for controlling the switch; and an actuating member connected with the housing for controlling the switch. Wherein the actuating member is configured to move between an off state and an on state, the motor stops running when the actuating member is in the off state, the motor rotates when the actuating member is in the on state, the actuating member is capable of moving to a predefined limit position in the on state, and the rotational speed of the motor corresponding to the predefined limit position is a predefined rotational speed. Wherein the control member includes an initial state, a first control state and a second control state, the motor is configured to run at a maximum rotational speed greater than the predefined rotational speed when the control member is in the second control state, and the motor is configured to run at an intermediate speed lower than the maximum rotational speed when the control member is in the first control state, the control member is configured to drive the actuating member to move from the off state to the on state during the movement process from an initial state to the first control state, and the actuating member does not cross the predefined limit position when the control member switches from the first control state to the second control state.

In one example, the actuating member is capable of moving to the predefined limit position relative the housing.

DETAILED DESCRIPTION

The technical solutions in the examples of the present disclosure will be clearly and completely described below in conjunction with the drawings.

Figure 1:
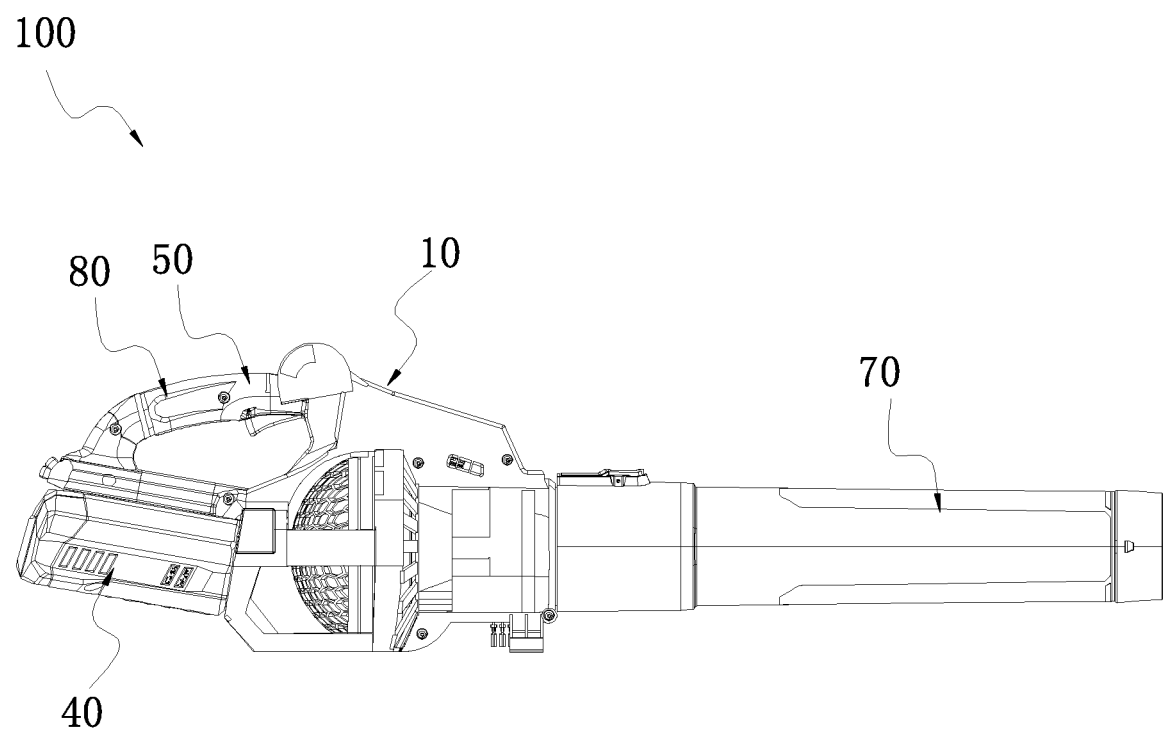
FIG. 1 is a schematic plan view of a blower according to a first example.
Figure 2:
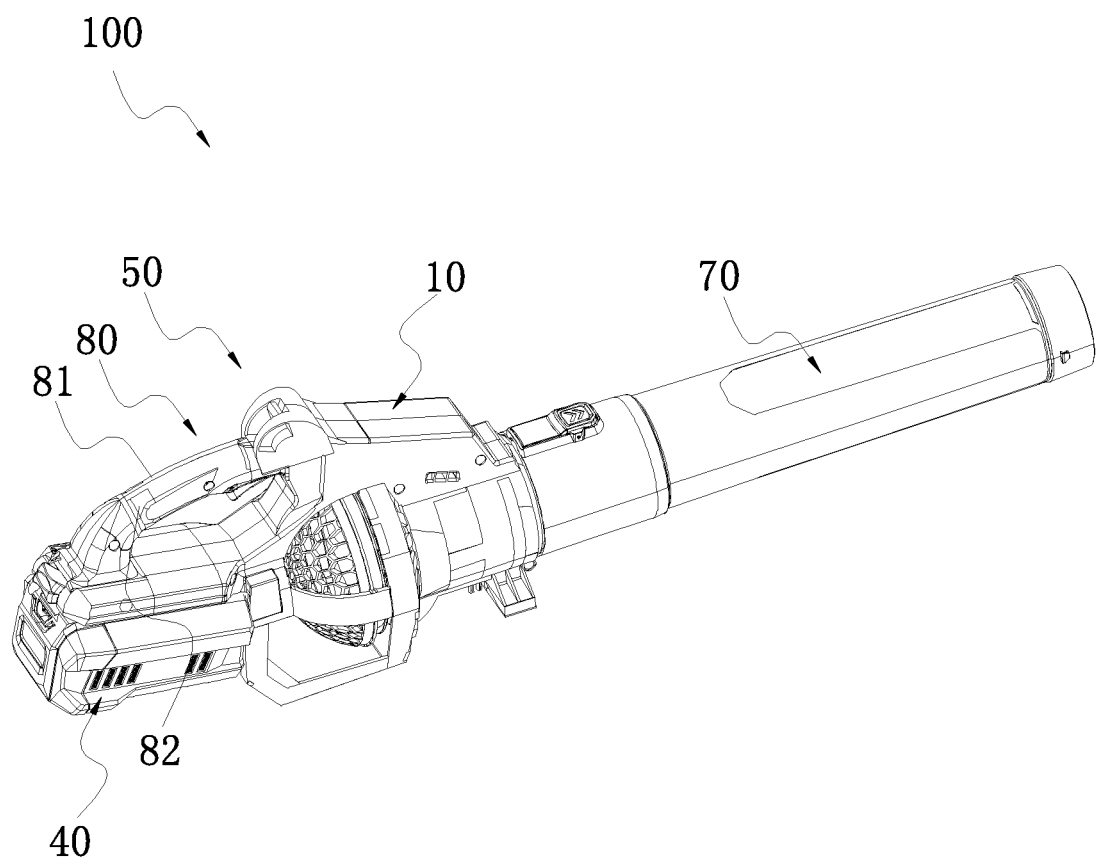
FIG. 2 is a three-dimensional schematic diagram of the blower shown in FIG. 1.

FIG. 1 shows a blower 100 for blowing away leaves and garbage on the ground or eaves. The blower 100 in this example is specifically a handheld axial blower. Of course, the blower 100 may also be other types of blowers, such as a backpack blower.

Referring to FIGS. 1-4, the blower includes: a housing 10, a blow tube 70, a prime mover, a fan 20, a speed regulator assembly 50 and a power source 40.

Wherein, the housing 10 is formed with an accommodating space, and the accommodating space is used for accommodating various parts inside the blower. That is, the prime mover, the fan 20 and the speed regulator assembly 50 are at least partially arranged inside the accommodating space. The housing 10 is at least formed with a handle portion 80, and the handle portion 80 is used for the user to hold.

The blow tube 70 is formed with an air duct for air circulation, and the blow tube 70 is detachably connected to the housing 10.

The prime mover is a motor 30; the motor 30 is enabled to rotate about a first axis 104; the motor 30 includes a motor shaft 31 extending along the first axis 104.

The fan 20 is connected to the motor 30. The fan 20 and the motor shaft 31 form a synchronous rotation, that is, the motor shaft 31 can drive the fan 20 to rotate to generate air flow, which is eventually blown out from the blow tube 70. It is noted that, the fan 20 may be directly driven by the motor 30, or the two may be connected through a transmission device.

The power source 40 provides energy source for the blower 100. The power source 40 may be AC or DC. In this example, the power source 40 is a battery pack that is engaged with the housing 10. It can be understood that, when not in use, the blower 100 may not include a power source. Further, the power source 40, not limited to a battery pack, may be an external DC power supply.

The speed regulator assembly 50 is installed on the housing 10; specifically, the speed regulator assembly 50 is installed on the handle portion, so that when the user holds the handle portion 80, the speed regulator assembly 50 is relatively easily to operate, thereby facilitating the drive of the motor 30.

Figure 4:
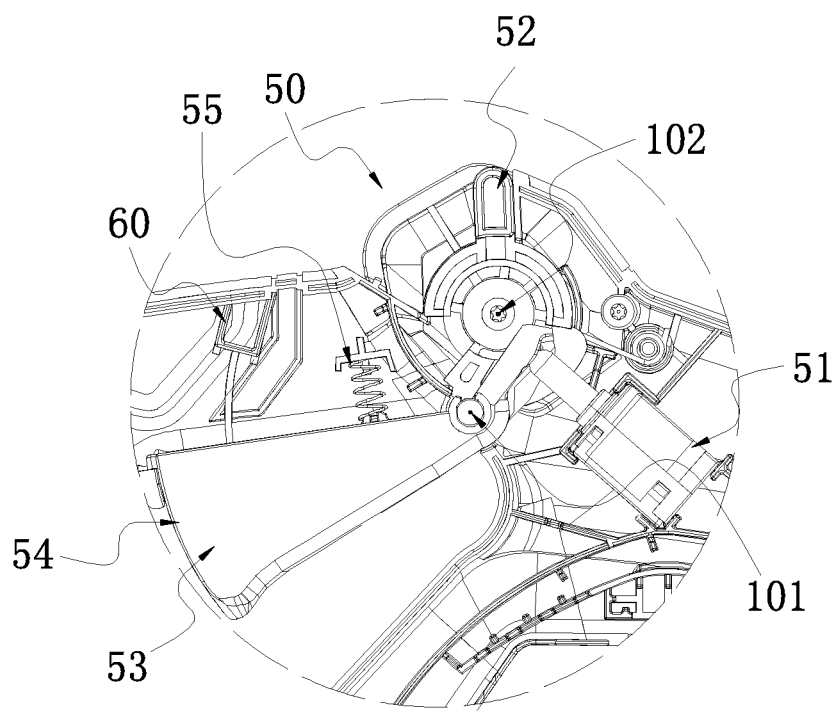
FIG. 4 is an enlarged view of a part of the blower shown in FIG. 3.
Figure 5:
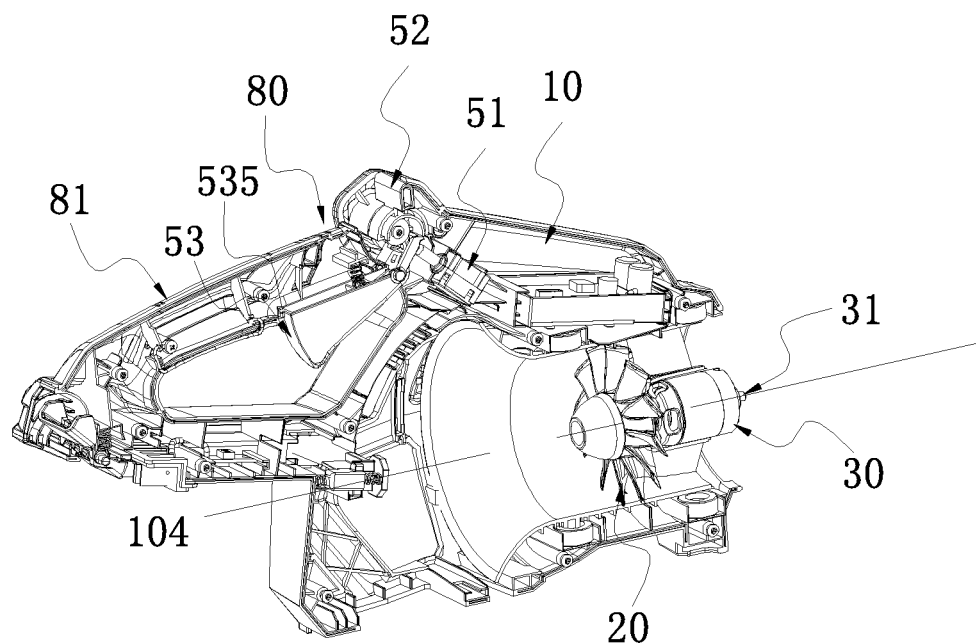
FIG. 5 is a perspective view of a part of the structure of the blower shown in FIG. 1.

As shown in FIG. 4, the speed regulator assembly 50 includes a switch 51, a control member 52, and an actuating member 53. The switch 51 is coupled with the motor 30 to control the operation of the motor 30; particularly, the switch 51 can control the motor 30 to rotate at any rotational speed between stop and the maximum rotational speed.

Figure 3:
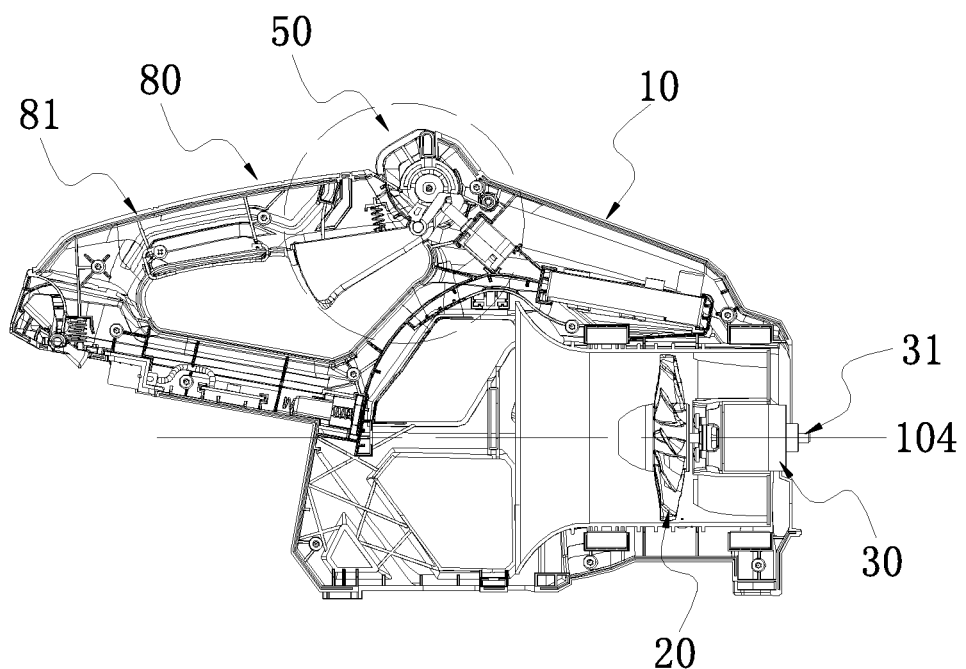
FIG. 3 is a partial structural diagram of the blower shown in FIG. 1 when an actuating member is in an off state.
Figure 6:
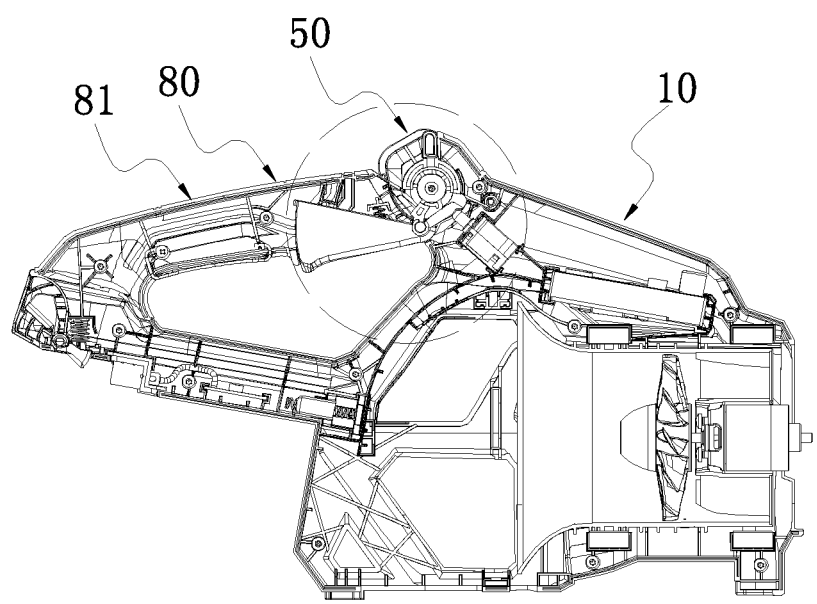
FIG. 6 is a partial structural diagram of the blower shown in FIG. 1 when the actuating member is in an on state.
Figure 7:
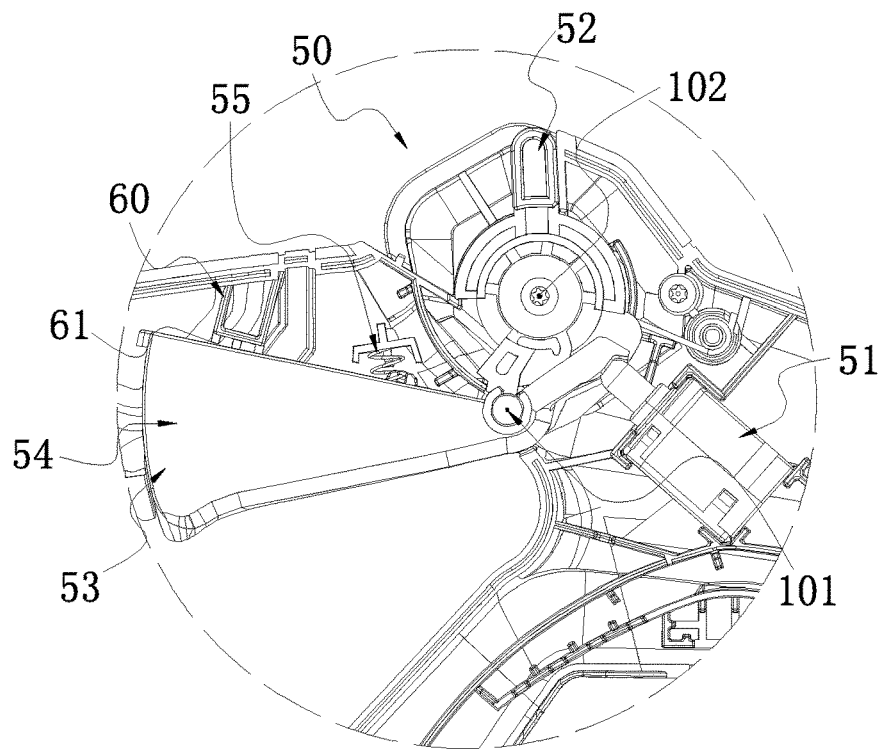
FIG. 7 is an enlarged view of a part of the blower shown in FIG. 6.

The actuating member 53 is rotatably connected with the housing 10 and can control the switch 51. During rotation, the actuating member 53 at least includes an off state and an on state, that is, the actuating member 53 is movable between the off state and the on state. As shown in FIGS. 3-4, the actuating member 53 is in the off state. When the actuating member 53 is in the off state, the motor 30 stops rotating. As shown in FIGS. 6-7, the actuating member 53 is in the on state. When the actuating member 53 is in the on state, the motor 30 can rotate at a certain speed. At this time, the rotational speed of the motor 30 is lower than the maximum rotational speed that the motor 30 can reach. The actuating member 53 can move to a predefined limit position in its on state, and when the actuating member 53 moves to the predefined limit position, the motor 30 can run at a predefined rotational speed, wherein the predefined rotational speed is lower than the maximum rotational speed that the motor 30 can reach. That is to say, when the actuating member 53 moves between the off state and the on state, the rotational speed of the motor 30 is kept lower than the maximum rotational speed that the motor 30 can reach. It should be noted that the predefined limit position here refers to the maximum angle that the actuating member 53 can rotate during rotation.

Figure 8:
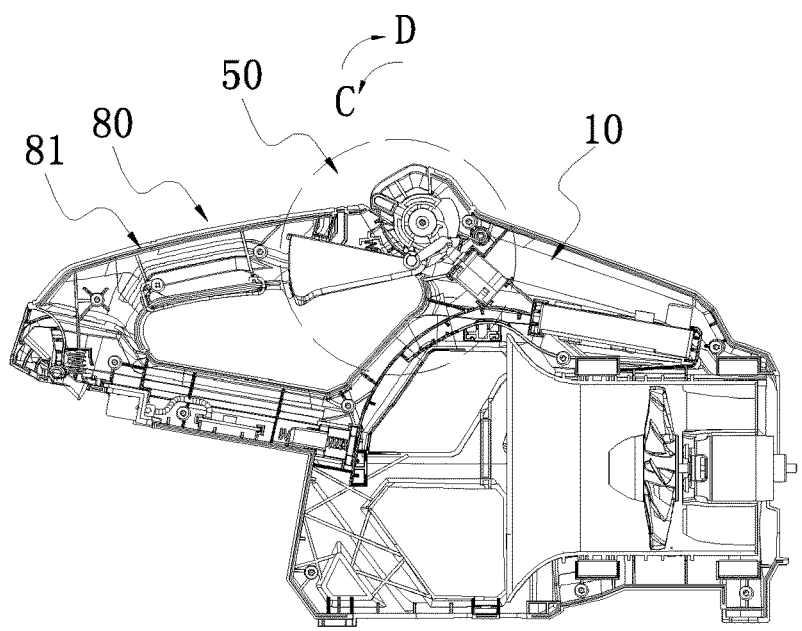
FIG. 8 is a partial structural diagram of the blower shown in FIG. 1 when a control member is in a second control state.
Figure 9:
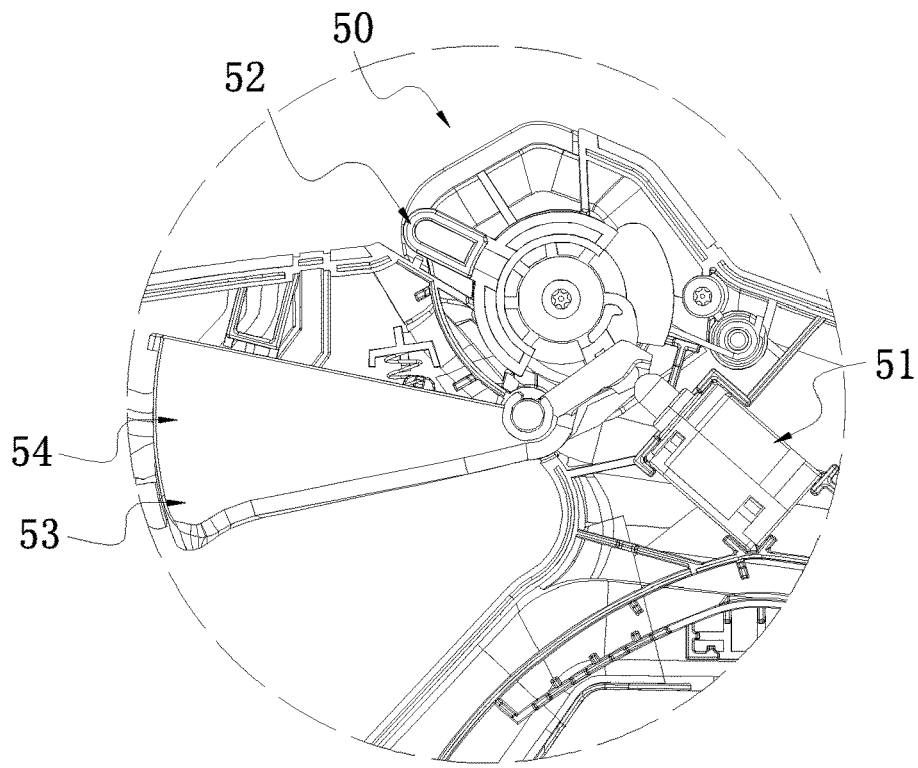
FIG. 9 is an enlarged view of a part of the blower shown in FIG. 8.
Figure 10:
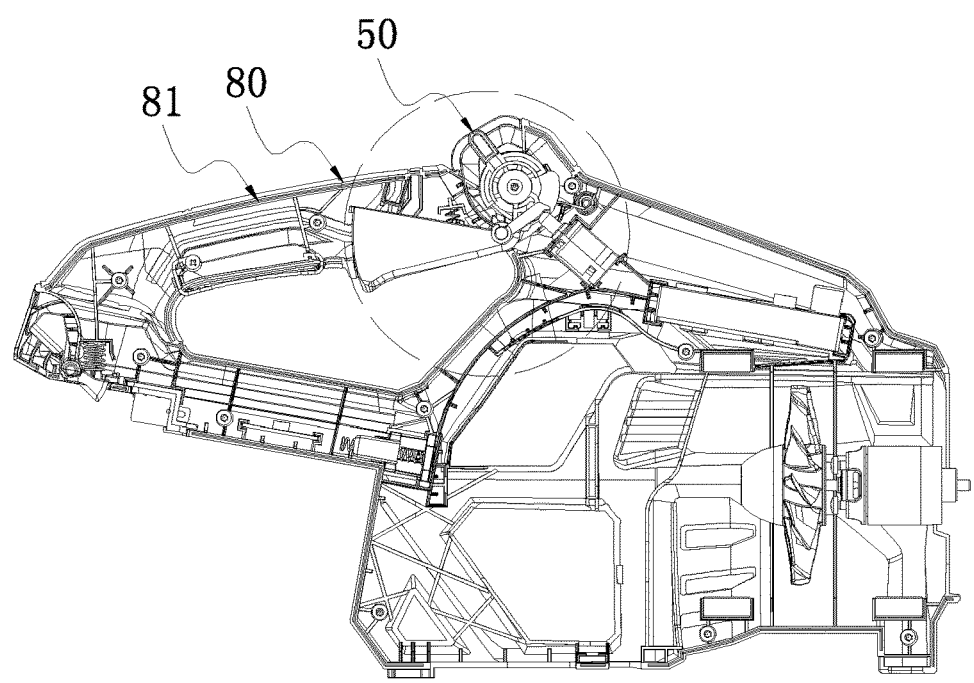
FIG. 10 is a partial structural diagram of the blower shown in FIG. 1 when the control member is in a first control state.
Figure 11:
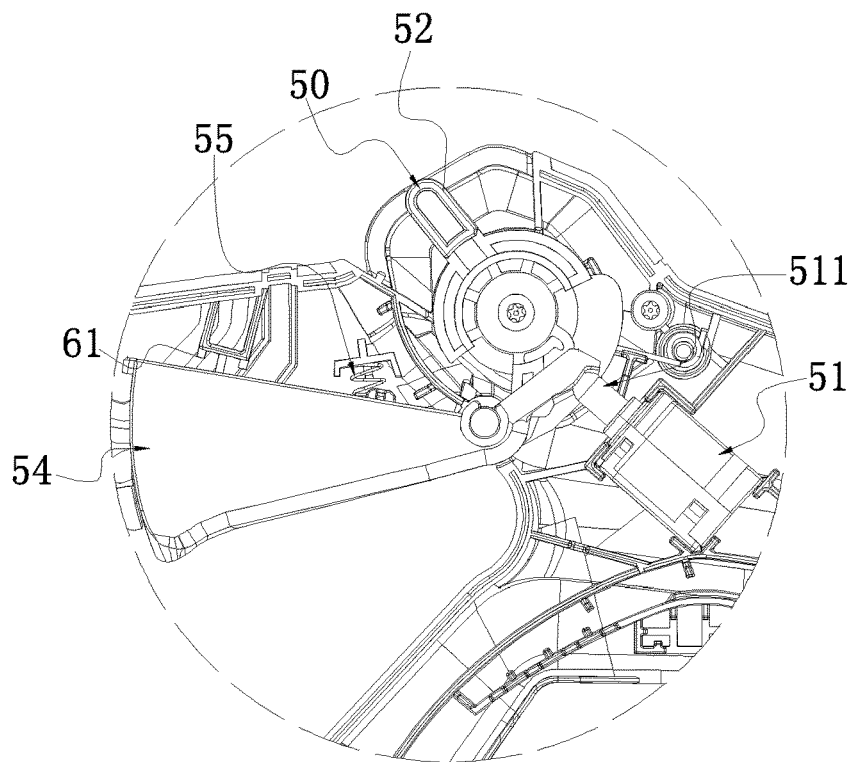
FIG. 11 is an enlarged view of a part of the blower shown in FIG. 10.
Figure 12:
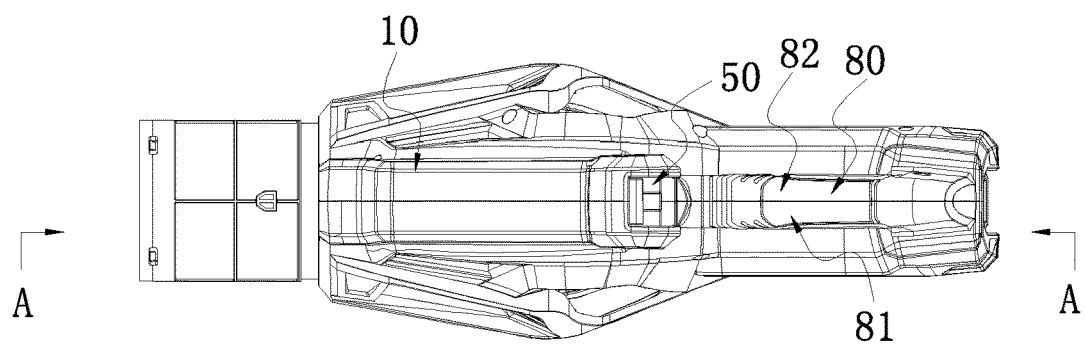
FIG. 12 is a plan view of a part of the structure of the blower shown in FIG. 1.
Figure 13:
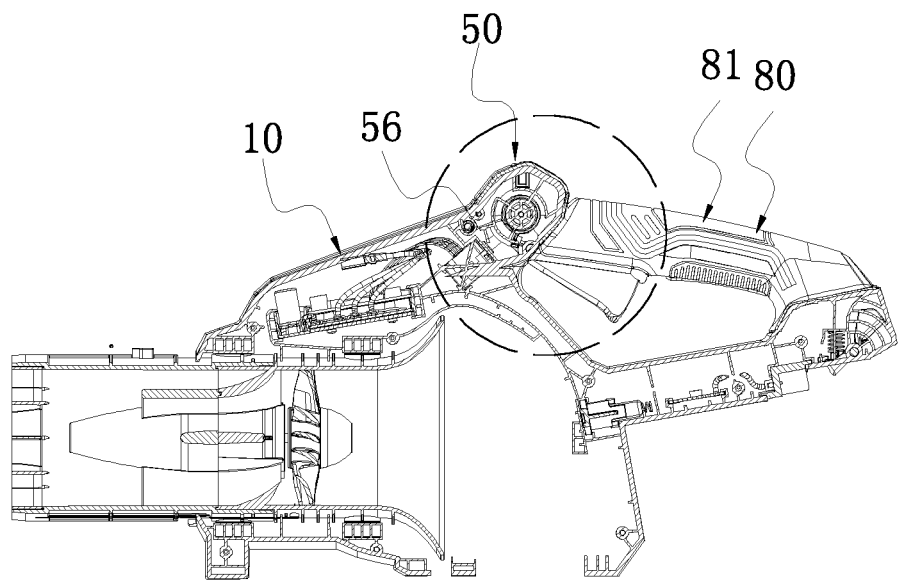
FIG. 13 is a cross-sectional view of the blower shown in FIG. 12.
Figure 14:
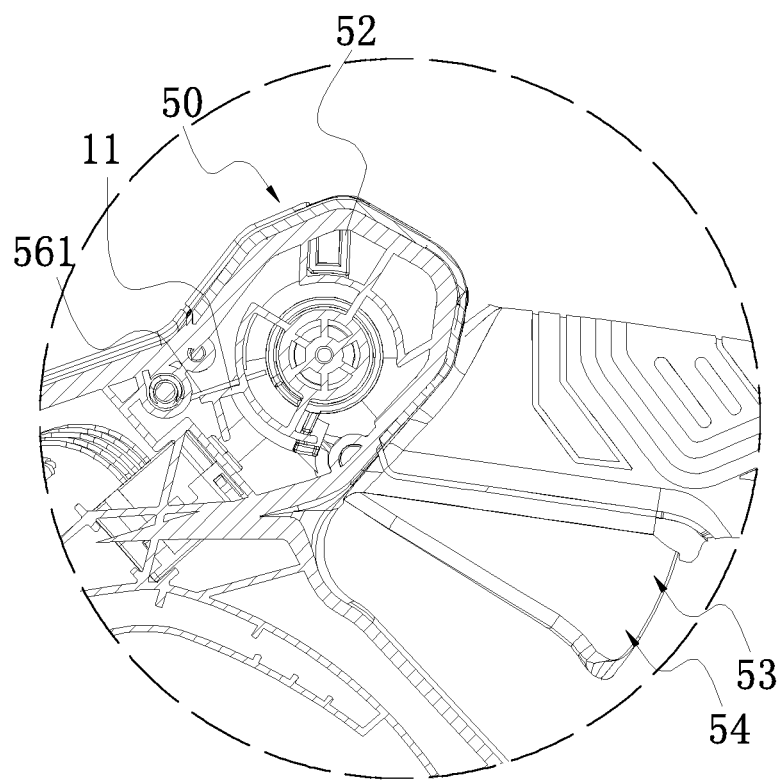
FIG. 14 is an enlarged view of a part of the blower shown in FIG. 13.
Figure 15:
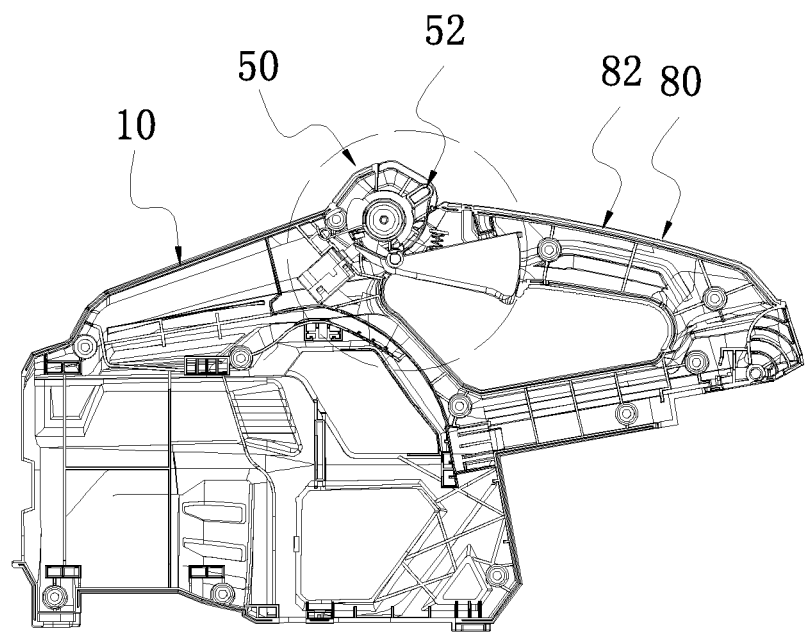
FIG. 15 is a partial structural diagram of the blower shown in FIG. 1 from another perspective when the control member is in the second control state.
Figure 16:
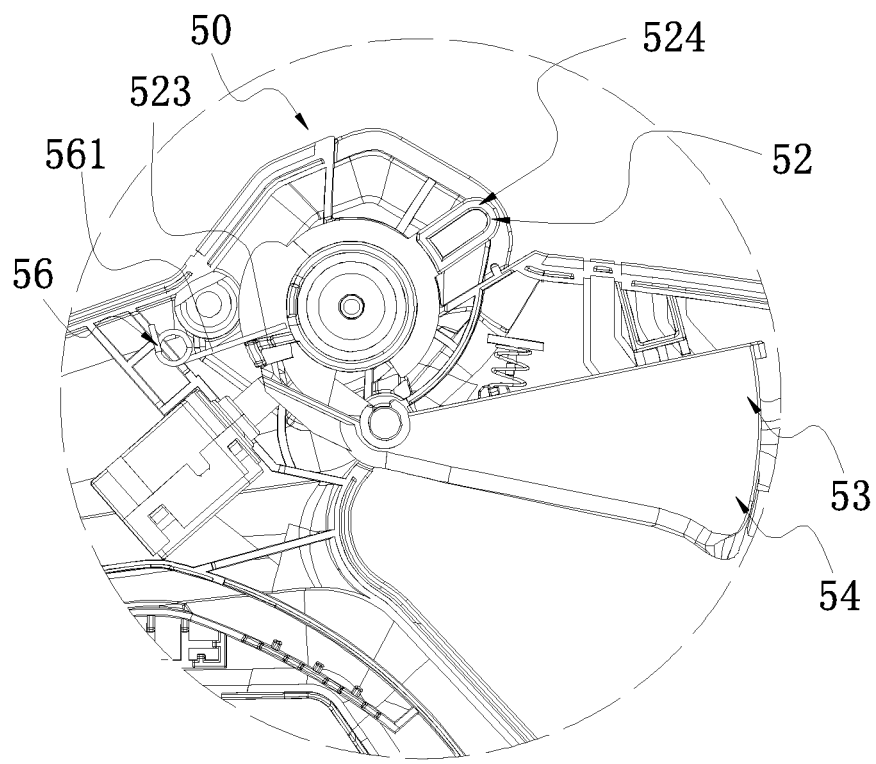
FIG. 16 is an enlarged view of a part of the blower shown in FIG. 15.

The control member 52 is rotatably connected with the housing 10 to control the switch 51. During movement, the control member 52 at least includes a second control state, a first control state and an initial state. As shown in FIGS. 3-4, the control member 52 is in the initial state. As shown in FIGS. 8-9, the control member 52 is in the second control state. When the control member 52 is in the second control state, the motor 30 can run at the maximum rotational speed, the air output volume of the blow tube 70 reaches the maximum, and the wind is also the strongest. As shown in FIGS. 10-11, the control member 52 is in the first control state. When the control member 52 is in the first control state, the motor 30 can run at an intermediate speed lower than the maximum rotational speed. During the movement process that triggers the first control state, the control member 52 can drive the actuating member 53 to move from the off state to the on state. During the process that the control member 52 switches from the first control state to the second control state, the actuating member 53 cannot cross the predefined limit position, that is, the actuating member 53 can only rotate up to the predefined limit position. The user controls the rotational speed of the motor 30 by operating the actuating member 53 or by operating the control member 52. For things that cannot be blown away, such as tree branches, pebbles and the like, drive the control member 52 to the second control state. When the blower 100 is powered by a battery pack, running the motor 30 of the blower 100 at the maximum rotational speed for a long time is prone to shorten the power supply time of the battery pack, which impacts the working hours of the blower 100, thus running the motor 30 of the blower 100 at the maximum rotational speed is a usage mode that generally only lasts for a short time, while the actuating member 53 can keep the blower 100 in a normal blowing state. Even if the user drives the actuating member 53 to the predefined limit position, it is still in the normal blowing state, and there is no need to control the force acting upon the actuating member 53. With this setting, it is easy for the user to control the rotational speed of the motor 30 of the blower 100 based on different situations, improving user convenience.

The initial state refers to the original position of the control member 52 (as shown in FIG. 4). Actually, the original position of the control member 52 is often not fixed for installation or operation reasons, which does not matter. As long as the position of the control member 52 is not affected by any external force, it can be regarded as the original position. Therefore, when the actuating member 53 is in the off state, as long as the control member 52 is in the original position and the motor 30 is not running, it can be said that the control member 52 is in the initial state. It should be noted here that when the blower 100 is in a working state and the control member 52 is in the initial state, the operating state of the motor 30 is not limited. In the present disclosure, the control member 52 being in the second control state refers to the position of the control member 52 when the motor 30 is running at the maximum rotational speed or the maximum power (as shown in FIG. 9). However, it should be noted that the second control state is not limited to some certain position, as long as the rotational speed or the power of the motor 30 reaches its maximum, the position can be referred as the second control state. The control member 52 being in the first control state refers to the position of the control member 52 when the motor 30 is running at a speed lower than the maximum rotational speed or at a power lower than the maximum power. The off state of the actuating member 53 refers to a position of the actuating member 53 when the power source 40 stops supplying power to the motor 30 (as shown in FIG. 4), and the motor 30 is stopped at this time. The on state of the actuating member 53 refers to a position of the actuating member 53 when the actuating member 53 is moved by force to make the power source 40 energize the motor 30, and that the motor 30 is running. Similarly, it should be understood that the position here is not limited to one place, as long as the above conditions are met. With the aforementioned settings, on the one hand, even if the actuating member 53 of the blower 100 is triggered accidentally, it can only trigger the normal blowing state, so as to avoid the situation that the blower 100 directly makes the motor 30 reach the maximum rotational speed and the maximum air output volume after the blower 100 is triggered by mistake. This effectively prevent the blower 100 from accidentally triggering the motor 30 to reach the maximum rotational speed. On the other hand, the motor 30 of the blower 100 running at the maximum rotational speed is not the normal working state of the blower 100. The normal blowing function can meet the requirements of normal operations, and the air output volume of the blower 100 can be adjusted according to different working conditions. Only when encountering stones or large branches, does the motor of the blower 100 need to run at the maximum rotational speed. With structure described above, even if the user drives the actuating member 53 to the extreme position, it is only in the normal blowing state, so that the user does not need to control the strength of holding the actuating member 53, which is convenient for the user to operate and more practicable.

Referring to FIGS. 5-9, the handle portion 80 includes a first housing 81 and a second housing 82, and a handle space is formed between the first housing 81 and the second housing 82. The actuating member 53 is mounted to the handle portion 80, wherein the actuating member 53 is movable within the handle space, the actuating member 53 is rotatably connected to the handle portion 80 and can rotate about a first rotation axis 101; the actuating member 53 is pressed against the switch 51, and is enabled to apply a driving force to trigger the switch 51, at which time the actuating member 53 can rotate with respect to the control member 52. Specifically, the actuating member 53 is a trigger 54, and the user operates the trigger 54 to make the trigger 54 rotate about the first rotation axis 101 in a first direction A; when the trigger 54 rotates between the off state and the on state, without being driven by an external force, the control member 52 stays in the initial position. The switch 51 is specifically a signal switch.

The speed regulator assembly 50 also includes a restoring spring 55 for resetting the trigger 54. Specifically, the restoring spring 55 is provided within the handle space, one end of the restoring spring 55 is pressed against the first housing 81 or the second housing 82, while the other end of the restoring spring 55 is mounted to the trigger 54. When the trigger 54 is driven by an external force to rotate, the trigger 54 will compress the restoring spring 55 to make it elastically deformed. When the trigger 54 loses the drive of the external force, under the elastic force, the trigger 54 will immediately rotate about the first rotation axis 101 along a second direction B to restore the off state.

The greater angle the trigger 54 rotates about the first rotation axis 101, the greater the rotational speed of the motor 30. In the on state, the trigger 54 has a plurality of start speed control positions; each start speed control position corresponds to a different rotational speed of the motor 30. For the convenience of description, among the plurality of start speed control positions, the start speed control position corresponding to the maximum rotational speed of the motor 30 is defined as the maximum start speed control position, and the maximum start speed control position is the predefined limit position, which corresponds to the aforementioned predefined rotational speed. The movement of the trigger 54 from the off state to the maximum start speed control position corresponds to a stepless speed change of the motor 30 with a constant speed increase. The above configurations are convenient for the user to blow for a short time when encountering fallen leaves, garbage, etc.

In another example, the housing 10 includes a handle portion and a body portion, and the speed regulator assembly 50 is at least partially disposed inside the handle portion, wherein the handle portion is removably fixed to the body portion. The handle portion and the body portion may be directly connected by means of screw connection, buckle connection, etc., or may be indirectly connected by means of an intermediate device, wherein the handle portion is fixedly mounted to the intermediate device and the intermediate device is fixedly installed on the body portion. The handle includes a first handle housing and a second handle housing. The first handle housing and the second handle housing may be connected by screw connection, snap connection, etc., and one of the first handle housing and the second handle housing may be disassembled separately, that is, the user can disassemble the first handle housing or the second handle housing by himself for the convenience of inspection, repair or maintenance.

The control member 52 is at least partially disposed in the handle space. The control member 52 is rotatably connected to the handle portion 80 and can rotate about a second rotation axis 102. The control member 52 is disposed adjacent to the switch 51. The control member 52 can abut against the switch 51 during the process of rotation and can apply a driving force to the switch 51 to drive the switch 51. The control member 52 is driven by an external force and rotates in a third direction C about the second rotation axis 102 so as to contact the switch 51. When the external force is removed, the control member 52 restores, that is, the control member 52 rotates in a fourth direction D about the second rotation axis 102 and returns to the first control state. The user continues to apply an external force to make the control member 52 continue to rotate in the fourth direction D about the second rotation axis 102, and finally return to the initial position. The first control state is between the initial state and the second control state. In this example, in the first control state, the control member 52 is capable of holding at a plurality of speed control positions, and each of the plurality of speed control positions corresponds to a different intermediate speed of the motor 30. For the convenience of description, among the plurality of speed control positions, one of the plurality of speed control positions corresponding to a maximum intermediate speed of the motor 30 is defined as the maximum speed control position when the control member 52 is in the first control state. The rotation of the control member 52 from the initial state to the maximum speed control position corresponds to a stepless speed change of the motor 30 with a maintainable constant speed increase.

Figure 18:
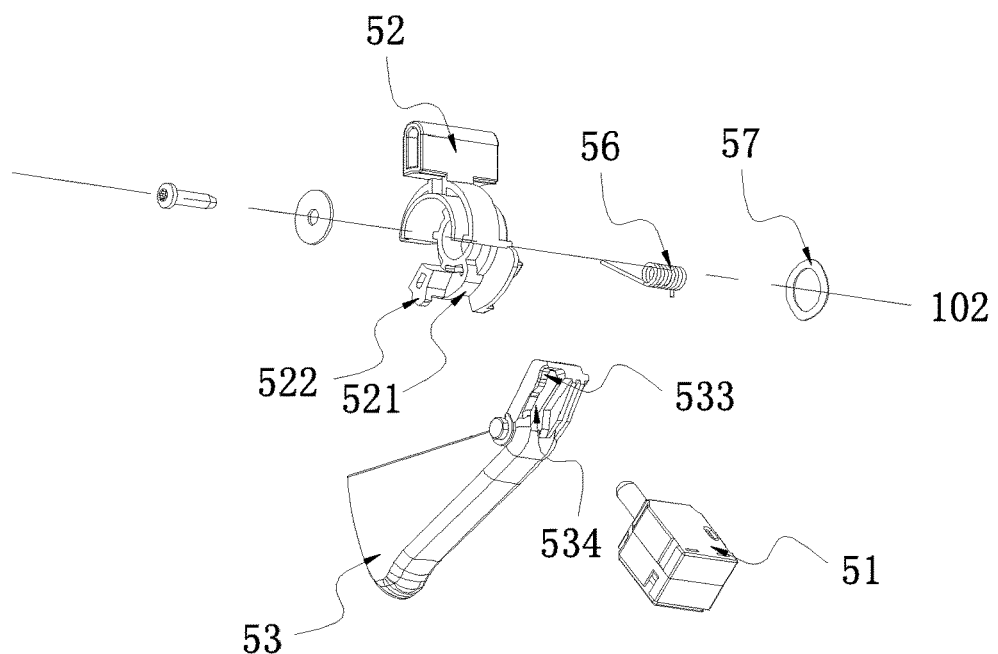
FIG. 18 is an exploded schematic diagram of a speed regulator assembly in the blower shown in FIG. 1.
Figure 19:
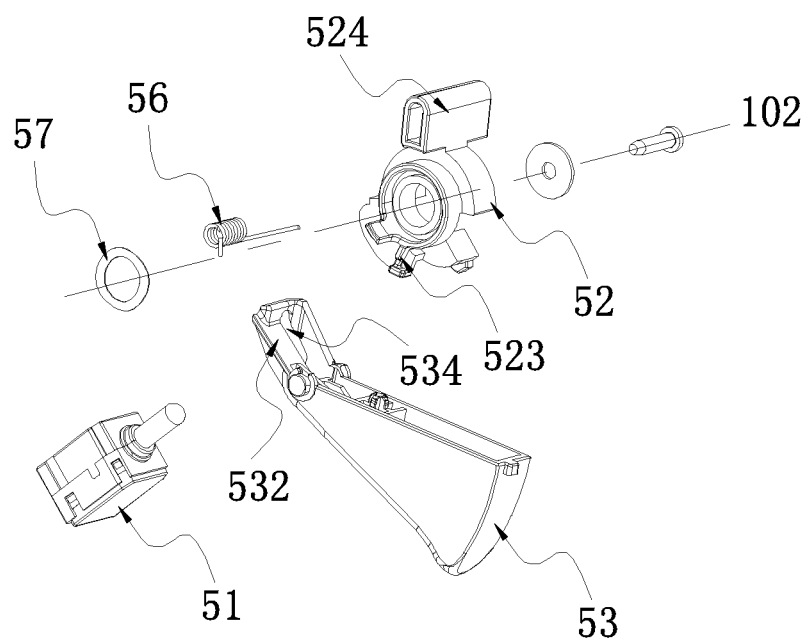
FIG. 19 is a schematic diagram of the exploded schematic diagram of the speed regulator assembly shown in FIG. 18 from another perspective.

Referring to FIGS. 18-19, the speed regulator assembly 50 also includes a locking device 57. When the control member 52 is in the speed control position, the locking device 57 is configured to apply a force to the control member 52 to prevent the control member 52 from moving. i.e., the locking device 57 can lock the position of the control member 52 after the control member 52 is rotated to the speed control position, that is, at this time, the user does not need to apply any force to the control member 52, and the position of the control member 52 will not move. The motor 30 will keep running at the speed corresponding to the speed control position. The above configurations can free the user from some of the operations when the user uses the blower 100 to work for a long time, making the blower 100 more convenient and labor-saving. In any speed control position, the control member 52 receives a frictional force in a tangential direction opposite to the direction of rotation from the trigger 54. Under no other external force, the control member 52 will, under the action of the frictional force, restore to the initial position. The locking device 57 applies a static frictional force with equal strength and opposite direction to said frictional force on the control member 52 such that the control member 52 does not shift. Specifically, the locking device 57 is a wave washer mounted between the housing 10 and control member 52; the control member 52 contacts the wave washer. During speed control process, the control member 52 squeezes the wave washer to make it elastically deformed. The wave washer exerts a reverse force on the control member 52. The reverse force is perpendicular to the movement plane of the control member 52, thereby generating a frictional force parallel to the movement direction of the control member 52.

Referring to FIGS. 12-16, the speed regulator assembly 50 further includes an elastic member 56, which is mounted to the housing 10. The control member 52 includes a third protrusion 523. The elastic member 56 has at least one free end 561, and the housing is provided with a supporting portion 11 at least partially in contact with the free end 561. When the control member 52 moves to the second control state under a force, the elastic member 56 applies a force to the control member 52 to restore the control member 52 to the maximum speed control position. Specifically, when the user drives the control member 52 to the second control state, the third protrusion 523 of the control member 52 contacts the free end 561 and compresses the free end 561 to make the elastic member 56 deformed; when the user revokes the external force, driven by the elastic force of the elastic member 56 and under no other external force, the control member 52 is made to rotate about the second rotation axis 102 in the fourth direction D to enter the first control state or the initial state. In this example, the control member 52 rebounds to the maximum speed control position, that is, the rebound inertia of the control member 52 is less than the frictional force of the locking device 57, so that the control member 52 only rebounds to the corresponding maximum speed control position. Of course, to avoid the situation that the control member 52 rebounds to the initial position, we can also arrange a limit component to overcome the inertia generated when the control member 52 rebounds. As a specific example, the elastic member 56 is a torsion spring, and the torsion spring has at least one free end 561, and the free end 561 is at least partially in contact with the support portion 11. The third protrusion 523 is fixedly connected or integrally formed with the control member 52.

When moving from the initial state to the second control state, the control member 52 can drive the actuating member 53 to move from the off state to the on state. When operating the control member 52, the user can drive the actuating member 53 to rotate about the second rotation axis 102 to the maximum start speed control position; at this time, the control member 52 is in contact with the switch 51 whereas the actuating member 53 is not in contact with the switch 51. When the user operates the actuating member 53, and if there is no other external force, the control member 52 will keep stationary. At this time, the actuating member 53 is in contact with the switch 51 whereas the control member 52 is not in contact with the switch 51. That is, the actuating member 53 moves together with the control member 52. The above configurations facilitate the user to control the air output volume of the blower 100 according to different situations. Also, the two different speed control modes of the actuating member 53 and the control member 52 can cater to users' different operating habits, which is more humane and more ergonomic.

Referring to FIGS. 6-7, the blower 100 further includes a stopper 60, and the stopper 60 is arranged on the rotation path of the actuating member 53. Specifically, when the actuating member 53 rotates about the first rotation axis 101, the actuating member 53 can rotate to the predefined limit position. When the actuating member 53 is in the predefined limit position, the motor 30 can run at a predefined rotational speed lower than the maximum rotational speed. The stopper 60 is arranged on the rotation path of the actuating member 53, and the stopper 60 prevents the actuating member 53 from crossing the predefined limit position when being pressed. When the actuating member 53 is driven to rotate from the off position to the predefined limit position: the greater angle the actuating member 53 rotates, the greater the rotational speed of the motor 30.

The stopper 60 is fixedly connected or integrally formed with the housing 10. Specifically, the stopper 60 is fixedly connected or integrally formed with the first housing 81 or the second housing 82. Of course, a plurality of stoppers 60 may also be provided on the first housing 81 or the second housing 82 to increase structural strength. The stopper 60 includes a stop surface 61, and the actuating member 53 has a contact surface 535. The user operates the actuating member 53; the actuating member 53 rotates under force to make the contact surface 535 in contact with the stop surface 61. In other words, once the contact surface 535 contacts the stop surface 61, the actuating member 53 stops rotating. The above configurations enable the user to control the air output volume of the blower 100 when the user operates the actuating member 53 with only one hand, and even if the user presses the actuating member 53 to the predefined limit position, the rotational speed of the motor 30 of the blower 100 is still at a relatively low state. In this way, the user does not need to deliberately control the pressing force of the actuating member 53 during operation, which makes the user more comfortable.

Figure 17:
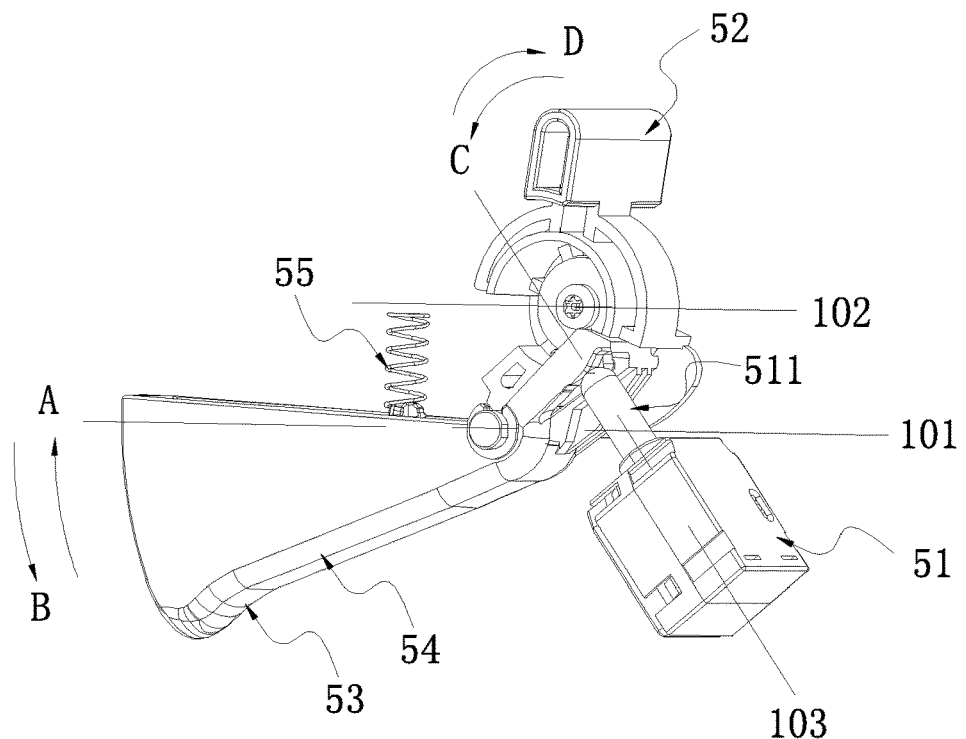
FIG. 17 is a partial structural diagram of the blower shown in FIG. 1.

Referring to FIG. 17, the switch 51 further includes a triggerable push rod 511, and the push rod 511 extends substantially along a first straight line direction 103. The actuating member 53 includes a drive portion 531, wherein the drive portion 531 of the actuating member 53 abuts against the push rod 511 of the switch 51, when the user applies an external force to the actuating member 53, the drive portion 531 drives the pushing rod 511 to move in the first straight line direction 103 to start the motor 30. As an optional example, the actuating member 53 may have multiple speed control positions during the process of rotation, and each speed control position corresponds to a different speed of the motor 30. It is understandable that, when the user applies force on the trigger 54 and the trigger 54 rotates in the first direction A about the first rotation axis 101, the driving portion 531 of the trigger 54 drives the push rod 511 to move along the first straight line direction 103. At this time, the rotational speed of the motor 30 increases with the angle of rotation of the actuating member 53. Conversely, when the user releases the trigger 54, the trigger 54 rebounds by the elastic force of the restoring spring 55, the push rod 511 restores after losing the drive of the external force, and the motor 30 stops.

Figure 20:
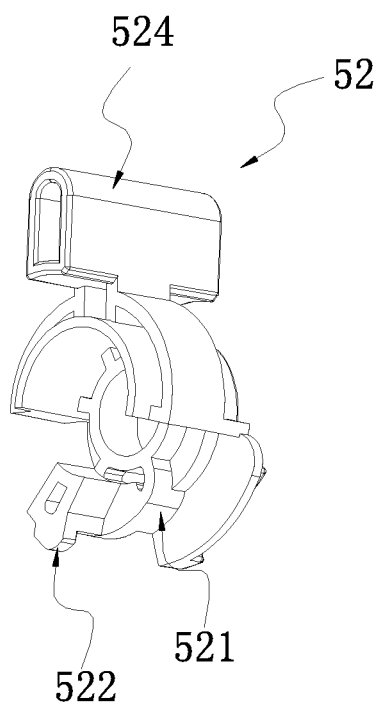
FIG. 20 is a three-dimensional schematic diagram of the control member in the speed regulator assembly shown FIG. 1.

Referring to FIGS. 18-20, the control member 52 includes a first protrusion 521, a second protrusion 522, and an operating portion 524; the trigger 54 includes a sliding portion 532. When the user drives the operating portion 524 of the control member 52 to rotate, the first protrusion 521 of the control member 52 contacts the sliding portion 532 of the trigger 54 and drives the sliding portion 532 to make the trigger 54 rotate about the first rotation axis 101, so that the driving portion 531 of the trigger 54 drives the push rod 511 to move along the first straight line direction 103 to activate the motor 30. The first protrusion 521 and the control member 52 are fixedly connected or integrally formed, wherein the fixed connection may be direct or indirect. Specifically, the first protrusion 521 and the control member 52 may be directly fixed by interference connection, welding, etc.; or, the first protrusion 521 and the control member 52 may be connected through a transmission member; of course, the first protrusion 521 and the control member 52 may be integrally formed. The specific connection between the first protrusion 521 and the control member 52 is not limited herein.

The second protrusion 522 and the first protrusion 521 are fixedly connected or integrally formed. The trigger 54 also includes a contact portion 533, and a through hole 534 is provided on the contact portion 533, wherein, during the process that the control member 52 rotates about the second rotation axis 102, the second protrusion 522 can at least partially pass through the through hole 534; at this time, the second protrusion 522 contacts the push rod 511 and drives the push rod 511 to move along the first straight line direction 103 until the control member 52 is in the second control state. Specifically, after the user applies a driving force to the control member 52, the control member 52 rotates in the third direction C; the first protrusion 521 drives the sliding portion 532 of the actuating member 53; the actuating member 53 rotates in the first direction A under a force; the actuating member 53 compresses the restoring spring 55, the drive portion 531 of the actuating member 53 drives the push rod 511, and the motor 30 starts. As the angle of rotation of the actuating member 53 increases, the rotational speed of the motor 30 also increases, and the actuating member 53 rotates until the contact surface 535 contacts the stop surface 61; at this time, the actuating member 53 stops moving because of the restriction from the stopper 60, whereas the control member 52 continues to rotate in the third direction C under a force; the first protrusion 521 continues to exert a force upon the sliding portion 532; after passing through the through hole 534, the second protrusion 522 continues to push the push rod 511 to move along the first straight line direction 103, so that the motor 30 can run at the maximum rotational speed. After the user releases the control member 52, the elastic member 56 rebounds to make the control member 52 restore to the maximum speed control position, changing the rotational speed of the motor 30 from the maximum rotational speed to the rotational speed of the motor 30 corresponding to the maximum speed control position of the control member 52. That means, in different working conditions, users can choose different air output volume according to the actual situation. For example, when using the blower 100 to blow fallen leaves and dust, upon encountering branches, pebbles, etc. difficult to blow, the control member 52 can be driven to the second control state. When the branches, pebbles, etc. are blown into predefined areas, the control member 52 can be released to restore to the first control state to continue working.

In this example, the first protrusion 521 is disposed between the second protrusion 522 and the third protrusion 523; the third protrusion 523 is disposed on a side away from the push rod 511. The first protrusion since portion 521, the second protrusion 522 and the third protrusion 523 are integrally formed. The first protrusion 521 has a first convex surface, and the first convex surface is substantially arc-shaped. The third protrusion 533 extends substantially along the direction of the second rotation axis 102.

The above shows and describes the basic principles, main features and advantages of this application. Those skilled in the art should understand that the above-mentioned examples do not limit the application in any form, and all technical solutions obtained by equivalent substitutions or equivalent transformations fall within the protection scope of this application.

What is claimed is:

1. A blower, comprising:
a housing;
a fan arranged in the housing;
a motor arranged in the housing and connected to the fan; and
a speed regulator assembly to control a rotational speed of the motor comprising a switch coupled to the motor to control an operation of the motor, a control member rotatably connected with the housing to control the switch and an actuating member rotatably connected with the housing to control the switch,
wherein the actuating member moves between an off state and an on state, the actuating member is capable of moving to a predefined limit position in the on state, the rotational speed of the motor corresponding to the predefined limit position is a predefined rotational speed, the motor stops running when the actuating member is in the off state, and the motor rotates when the actuating member is in the on state,
wherein the control member comprises a first control state and a second control state, the motor runs at a maximum rotational speed greater than the predefined rotational speed when the control member is in the second control state, the motor runs at an intermediate speed lower than the maximum rotational speed when the control member is in the first control state, the control member drives the actuating member to move from the off state to the on state during a transition from an initial state to the first control state, and the actuating member does not cross the predefined limit position when the control member switches from the first control state to the second control state, and
wherein when the actuating member is moving to the predefined limit position, the motor runs at a predefined rotational speed that is lower than the maximum rotational speed.

2. The blower of claim 1, wherein, when the actuating member is in the off state and the control member is in the initial state, the motor stops running and the control member forms a rotatable connection with the housing about a second rotation axis, and, when the actuating member is not driven by an external force, the initial state, the first control state, and the second control state respectively correspond to different rotation angles of the control member relative to the housing.

3. The blower of claim 1, wherein the actuating member rotates with respect to the housing about a first rotation axis.

4. The blower of claim 1, wherein the control member rotates with respect to the housing about a second rotation axis.

5. The blower of claim 1, wherein the actuating member is at least partially disposed in the housing, the actuating member rotates about a first rotation axis, and the actuating member is rotates to the on state from the off state with respect to the control member.

6. The blower of claim 5, wherein the control member is at least partially disposed in the housing, the control member forms a rotatable connection with the housing about a second rotation axis, and the control member is abuts against the switch when the control member rotates about the second rotation axis to the second control state.

7. The blower of claim 6, wherein the actuating member moves to the predefined limit position driven by the control member.

8. The blower of claim 1, wherein the blower further comprises a stopper for preventing the actuating member from passing the predefined limit position where the motor runs at the predefined rotational speed lower than the maximum rotational speed.

9. The blower of claim 8, wherein the blower further comprises a handle portion fixedly connected or integrally formed with the housing, the handle portion comprises a first housing and a second housing, a handle space is formed between the first housing and the second housing, the actuating member is mounted to the handle portion, the actuating member is at least partially accommodated in the handle space, and the stopper is arranged in the handle space and is fixedly connected or integrally formed with the handle portion.

10. The blower of claim 9, wherein the switch comprises a push rod that can be triggered by the control member and the actuating member, the actuating member comprises a drive portion engaging with the push rod, and, when the actuating member rotates about a first rotation axis to enter the on state, the drive portion drives the push rod to move in a first straight line direction.

11. The blower of claim 10, wherein the control member comprises a first protrusion, the actuating member further comprises a sliding portion, and, when the control member rotates about a second rotation axis to enter the first control state from the initial state, the first protrusion drives the sliding portion of the actuating member to rotate the actuating member.

12. The blower of claim 11, wherein the control member further comprises a second protrusion, the actuating member is provided with a through hole, and, when the control member rotates to the second control state from the first control state, the second protrusion passes through the through hole to drive the push rod to move along the first straight line direction.

13. The blower of claim 1, wherein the speed regulator assembly further comprises an elastic member mounted to the housing and the elastic member applies a force to the control member to restore the control member from the second control state to the first control state.

14. The blower of claim 13, wherein the control member comprises a third protrusion fixedly connected or integrally formed with the control member, the elastic member comprises a free end, the housing is provided with a supporting portion that restricts the free end from moving freely, and the free end is in contact with the third protrusion when the control member is in the second control state.

15. The blower of claim 1, wherein in the first control state, the control member is capable of holding at a plurality of speed control positions, each of the plurality of speed control positions corresponds to a different intermediate speed of the motor, and one of the plurality of speed control positions corresponding to a maximum intermediate speed of the motor is the maximum speed control position when the control member is in the first control state.

16. The blower of claim 15, wherein the speed regulator assembly further comprises a locking device and, when the control member is in one of the plurality of speed control position, the locking device applies a force to prevent the control member from moving.

17. The blower of claim 15, wherein the speed regulator assembly further comprises an elastic member mounted to the housing and the elastic member applies a force to the control member to restore the control member from the second control state to the maximum speed control position.

18. The blower of claim 1, wherein, when the control member is in the second control state, the control member rotates with respect to the actuating member about a second rotation axis.

19. A blower, comprising:
a housing;
a fan arranged in the housing;
a motor arranged in the housing to drive the fan to rotate;
a switch coupled to the motor to control an operation of the motor;
a control member connected with the housing to control the switch; and
an actuating member connected with the housing to control the switch;
wherein the actuating member is moves between an off state and an on state, the motor stops running when the actuating member is in the off state, the motor rotates when the actuating member is in the on state, the actuating member is capable of moving to a predefined limit position in the on state, and a rotational speed of the motor corresponding to the predefined limit position is a predefined rotational speed; and
wherein the control member comprises an initial state, a first control state and a second control state, the motor runs at a maximum rotational speed greater than the predefined rotational speed when the control member is in the second control state, and the motor runs at an intermediate speed lower than the maximum rotational speed when the control member is in the first control state, the control member drives the actuating member to move from the off state to the on state during a transition from an initial state to the first control state, and the actuating member does not cross the predefined limit position when the control member switches from the first control state to the second control state,
and wherein when the actuating member is moving to the predefined limit position, the motor runs at a predefined rotational speed that is lower than the maximum rotational speed.

20. The blower of claim 19, wherein the actuating member is capable of moving to the predefined limit position relative the housing.

* * * * *